United States Patent [19]

Hirose et al.

[11] Patent Number: 5,253,247
[45] Date of Patent: Oct. 12, 1993

[54] TRAFFIC CONTROL METHOD AND TRAFFIC CONTROL SYSTEM FOR CONTROLLING CELL TRAFFIC IN AN ASYNCHRONOUS TRANSFER MODE COMMUNICATION NETWORK

[75] Inventors: Tsuguhiro Hirose; Toshikazu Kodama; Takashi Kamitake, all of Tokyo, Japan

[73] Assignee: Kabushiki Kaisha Toshiba, Tokyo, Japan

[21] Appl. No.: 746,973

[22] Filed: Aug. 19, 1991

[30] Foreign Application Priority Data

Aug. 20, 1990 [JP] Japan .................................. 2-217083

[51] Int. Cl.$^5$ ......................... H04J 3/14; H04Q 11/00
[52] U.S. Cl. .................................... 370/14; 370/54; 370/94.1; 340/825.06; 379/220
[58] Field of Search ................ 370/13, 14, 17, 54, 370/58.1, 58.2, 58.3, 60, 94.1; 340/825.06, 826; 379/95, 220, 271, 272

[56] References Cited

U.S. PATENT DOCUMENTS

| | | | |
|---|---|---|---|
| 4,484,326 | 11/1984 | Turner | 370/60 |
| 4,984,264 | 1/1991 | Katsube | 370/54 |
| 5,042,027 | 8/1991 | Takase et al. | 370/54 |
| 5,067,123 | 11/1991 | Hyodo et al. | 370/94.1 |
| 5,119,367 | 6/1992 | Kawakatsu et al. | 370/94.1 |

OTHER PUBLICATIONS

Ohta et al., "A Dynamically Controllable ATM Transport Network Based on the Virtual Path Concept", Mar. 1988 IEEE, pp. 1272-1276.

IEEE Network: The Magazine of Computer Communications, vol. 4, No. 3, May 1990, pp. 18-23, C. A. Cooper, et al., "Toward a Broadband Congestion Control Strategy".

International Switching Symposium 1990, vol. 1, May 28-Jun. 1, 1990, pp. 111-118, K. Sallberg, et al., "A Resource Allocation Framework in B-ISDN".

Primary Examiner—Douglas W. Olms
Assistant Examiner—Alpus H. Hsu
Attorney, Agent, or Firm—Oblon, Spivak, McClelland, Maier & Neustadt

[57] ABSTRACT

A traffic control method for controlling the traffic characteristics of fixed-length information units and transmitting the information units through a number of divided systems in a ATM communication network comprises a step for monitoring the information units to determine whether or not the information units are transmitted according to prescribed traffic characteristics at the inlets of a plurality of divided systems, a step for regulating the information unit which violates the prescribed traffic characteristics at the inlets of the divided systems, a step for monitoring the information units to determine whether or not the information units are transmitted according to prescribed traffic characteristics at the outlets of a plurality of divided systems, and a step for shaping the information unit which violates the prescribed traffic characteristics at the outlets of the divided systems.

9 Claims, 5 Drawing Sheets

TRAFFIC CONTROL METHOD AND TRAFFIC CONTROL SYSTEM FOR CONTROLLING CELL TRAFFIC IN AN ASYNCHRONOUS TRANSFER MODE COMMUNICATION NETWORK

BACKGROUND OF THE INVENTION

1. Field of the Invention

The present invention relates to a traffic control method and system for controlling cell traffic in an asynchronous transfer mode (ATM) communication network.

2. Description of Background

In recent communications, many types of communication media such as voice, information data, facsimile, and picture are mixed, while communication networks are independently formed for each medium or each use in conventional communication networks. Therefore, those networks are inadequate for reducing communication costs by unifying communication facilities and providing flexible networks.

As mentioned above, recently the need has developed for communications for various purposes so that the unification of communication networks is required to efficiently provide communication service. To satisfy that requirement, new transmission techniques, which differ from conventional line or packet switching, have been researched and developed.

In particular, an asynchronous transfer mode (ATM) has attracted considerable attention because the ATM is one transmission mode for efficiently embodying high speed and wide band communication networks. In the ATM, both techniques of recent line switching and packet switching are unified and many pieces of information such as voice, data, and picture are divided into information units to be transmitted and switched at 150 Mbits per second. The unit is called a "cell" and has a prescribed length.

FIG. 1 schematically shows an ATM communication network. In an ATM communication network 34, a plurality of terminals 31, 32, 33, 35, 36, and 37 are connected and cell transmission is executed between the terminals through the ATM communication network 34.

In this case, no physical restriction such as the allocation of time slots is imposed on each terminal.

In the ATM communication network 34, exchanges with switching functions are provided to transmit a sequence of cells between the terminals through one of physical transmission channels. As mentioned above, because no physical restriction such as the allocation of timing for submitting cells to the network is imposed on each terminal, there is a possibility that the cells are simultaneously transmitted to the same physical transmission channel from the terminals 31, 32, 33, 35, 36, and 37. Therefore, the exchange is provided with a switch for switching the cells and a buffer for temporarily storing the cells to realize the switching function. The buffer has a certain capacity to store the cells transmitted from the terminals 31, 32, 33, 35, 36, and 37. To store a large number of cells, not only the size of the equipment for realizing the switching function is too large but also the cost of the equipment is too high.

Therefore, practically, the buffer for storing the cells transmitted from the terminals 31, 32, 33, 35 36, and 37 is reduced in size to a certain extent. This means that the cells transmitted from the terminals 31, 32, 33, 35, 36, and 37 must reliably be stored by utilizing the reduced buffer capacity. Therefore, when the cells are intensively transmitted from the terminals 31, 32, 33, 35, 36, and 37 to the buffer, some cells cannot be stored in the buffer because the buffer capacity is insufficient. As a result, the buffer overflows and some cells are lost.

To cope with this situation, a method has been implemented. Whereby, because the buffer is utilized in common by the terminals 31, 32, 33, 35, 36, and 37, each terminal is assigned a prescribed buffer capacity. Therefore, prior to the communication, traffic characteristics such as a minimum cell arrival interval and a maximum cell arrival frequency are declared by each terminal. That is, each of the cells provided from each of the terminals is transmitted to the ATM communication network 34 in accordance with the minimum cell arrival interval. Also, a sequence of cells provided from each of the terminals is transmitted to the ATM communication network 34 in accordance with the maximum cell arrival frequency. Thereafter the required buffer capacity for each terminal is calculated to satisfy a prescribed transmission quality based on the declared traffic characteristics.

Thereafter, when the summation of the buffer capacities of all terminals does not exceed the buffer capacity of the provided buffer, the communication of the terminal is admitted to the network 34. On the other hand, when the summation of the buffer capacities required by terminals exceeds the capacity of the provided buffer so that a summed buffer capacity more than the capacity of the provided buffer is required to perform the communication, the communication is rejected. If possible, the communication may be suspended until the communication of a part of terminals is terminated, and it can be admitted. As an example of the assignment of the buffer capacity, the minimum cell arrival interval or the maximum cell arrival frequency is negotiated between the communication network 34 and each terminal prior to the communication so that the buffer capacity is logically assigned for each terminal in the communication network 34 by considering the minimum cell arrival interval and the maximum cell arrival frequency. The minimum cell arrival interval means that the cells are transmitted from a certain terminal at prescribed intervals which are each within the minimum cell arrival interval. The maximum cell arrival frequency means the upper limitation of the number of cells transmitted from a certain terminal within a prescrived period of time.

However, in the above assignment of the buffer capacity, there is a case that a larger number of cells than the negotiated number of cells are transmitted from a certain terminal intentionally or by a failure. To cope with this situation, cells flow in the ATM communication network 34 in accordance with inlet traffic characteristics determined by intervals of the cells and the frequency of the cells is monitored at the inlet of the ATM communication network 34 so that the inflow of the cells exceeding prescribed traffic characteristics determined by considering the minimum cell arrival interval and the maximum cell arrival frequency allowed to the cells transmitted to the ATM communication network at the 34 is regulated and, for example, rejected. This operation is called "policing", or UPC (Usage Parameter Control).

On the other hand, the inlet traffic characteristics are varied to outlet traffic characteristics determined by intervals and the frequency of the cells flowing out at the of the ATM communication network 34 because the cells are temporarily stored in the buffer to prevent cell loss due to simultaneous arrival of the cells. Therefore, the outflow of the cells in accordance with the outlet traffic characteristics must be controlled and corrected to the a prescribed cell flow in accordance with the prescribed traffic characteristics at the outlet of the ATM communication network 34 when the cells are transmitted to another ATM communication network. Then, the controlled cells are transmitted through the other ATM communication network to a prescribed terminal. This operation is called "traffic shaping". Policing and traffic shaping are implemented to make the sphere of the responsibility clear when a first communication network managed by a first company is connected with a second communication network managed by a second company so that the cells are transmitted through the first and second communication networks.

However, in the case where a sequence of cells is are transmitted in an ATM communication network which is subdivided into many systems, the traffic characteristics of the sequence of cells are changed at the outlet of each system because a switching operation and a multiplexing operation are performed at each subdivided system. The change of the traffic characteristics is described with reference to FIG. 7 in detail. As shown in FIG. 7, a sequence of cells C1 is transmitted between terminals through a physical transmission channel A at a cell arrival interval of 10 unit length. is, the cells C1 are transmitted at traffic characteristics determined by the cell arrival interval of 10 unit length. Also, another sequence of cells C2 is transmitted between the terminals through another physical transmission channel B at a cell arrival interval of 10 unit length. That is, the cells C2 are transmitted at the same traffic characteristics as those of the cells C1. When both the physical transmission channels A, B are combined at a system such as an exchange to a physical transmission channel C, a sequence of cells transmitted through the physical transmission channel C is not transmitted at traffic characteristics determined by a cell arrival interval of 5 unit length but transmitted at traffic characteristics determined by a cell arrival interval of 1 unit length. Therefore, the traffic characteristics of the cells is considerably changed at each of the systems. The influence of the change of the traffic characteristics extends to the downstream subdivided systems arranged at the outlet direction of the ATM communication network.

Therefore, an extra amount of control is required to transmit the cells while predicting the above change in advance.

Moreover, when the traffic characteristics are extremely changed at a system due to a failure of the system, it is difficult to specify the location of the system relating to the failure in the ATM communication network.

As mentioned above, in the case where policing and traffic shaping are performed at the inlet and outlet portions of the ATM communication network and the cells are transmitted through the ATM communication network which is subdivided into many systems, the traffic characteristics of the cells are changed at the outlet of each system. Therefore, there is a drawback that the influence of the change of the traffic characteristics extends to the downstream subdivided systems arranged at the outlet direction of the ATM communication network.

Moreover, to cope with the above drawback, an extra amount of control is required to transmit the cells while predicting the above change in advance.

Further, there is another drawback in that it is difficult to specify the location of a failure system when the traffic characteristics are extremely changed somewhere in the ATM communication network.

SUMMARY OF THE INVENTION

An object of the present invention is to provide, with due consideration to the drawbacks of such conventional networks, a traffic control method and a traffic control system in which the transmission quality does not deteriorate at the subdivided systems arranged at the outlet direction of the ATM communication network even if a switching operation and a multiplexing operation are performed and the traffic characteristics of cells are changed.

Another object of the present invention is to provide, with due consideration to the drawbacks of such conventional networks, a traffic control method and a traffic control system in which it is capable to specify a system failure in which the traffic characteristics of cells are changed.

These object are achieved by the provision of a traffic control method for controlling the traffic characteristics of fixed-length information units and transmitting the information through a number of divided systems in a ATM communication network, comprising:

monitoring the information to determine whether or not the information is transmitted according to prescribed traffic characteristics at the inlets of one or more divided systems; and regulating the information which violates the prescribed traffic characteristics at the inlets of one or more divided systems.

Moreover, those object are achieved by the provision of a traffic control method for controlling the traffic characteristics of fixed-length information units and transmitting the information through a number of divided systems in a ATM communication network, comprising:

monitoring the information to determine whether or not the information is transmitted according to prescribed traffic characteristics at the outlets of one or more divided systems; and shaping the information which violates the prescribed traffic characteristics at the outlets of the divided systems.

In the communications through the ATM communication network, the fixed-length information units (a group of cells) are normally transmitted from one terminal to another terminal through a multiplexed transmitting line (channel) according to the traffic characteristics assigned to a corresponding terminal.

However, when a number of cells are intensively transmitted to the multiplexed transmitting line from a number of terminals, the transmission quality is lowered at the outlet of one divided system because the cells overflow at the buffer of each system.

Therefore, in the present invention, whether or not the operator sends the cells according to the assigned traffic characteristics is initially monitored at the inlets of a plurality of divided systems such as ATM exchanges. Then, when the communication violates the assigned traffic characteristic, the communication is regulated.

Second, whether or not the communication is implemented according to the prescribed traffic characteristics is monitored at the outlets of a plurality of divided systems such as ATM exchanges. Then, when the traffic characteristics are violated because a number of cells are intensively gathered in a system, the communication is shaped.

Accordingly, because the communication violating the traffic characteristics is immediately corrected at the outlets of the divided systems, the transmission quality is not lowered.

Moreover, because the traffic characteristics are monitored at the inlets of the divided systems, the sphere of the operator's responsibility can be clarified.

The above objects are also achieved by the provision of a traffic control system for controlling the traffic characteristics of fixed-length information units and transmitting the information through a number of divided systems in an ATM communication network, comprising:

a plurality of information flow-regulating sections for monitoring whether or not the information is transmitted according to prescribed traffic characteristics and regulating the information which violates the prescribed traffic characteristics, each information flow-regulating section being arranged to the inlet of one divided system; and a plurality of information flow-shaping sections for monitoring whether or not the information is transmitted according to the prescribed traffic characteristics and shaping the information which violates the prescribed traffic characteristics, each information flow-shaping section being arranged to the outlet of one divided system.

In the above configuration, when an operator (correspondent) sends the fixed-length information units (a group of cells) in violation of assigned traffic characteristics, the communication is regulated in the information flow-regulating sections which are arranged into a plurality of divided systems. Moreover, when the traffic characteristics are violated because a number of cells is intensively gathered into a system, the traffic characteristics are shaped in the information flow shaping sections which are arranged into a plurality of divided systems.

Accordingly, the traffic control method according to the present invention can be easily embodied.

DETAILED DESCRIPTION OF THE PREFERRED EMBODIMENTS

The preferred embodiments are described with reference to FIG. 2 to FIG. 6.

Figure 1:
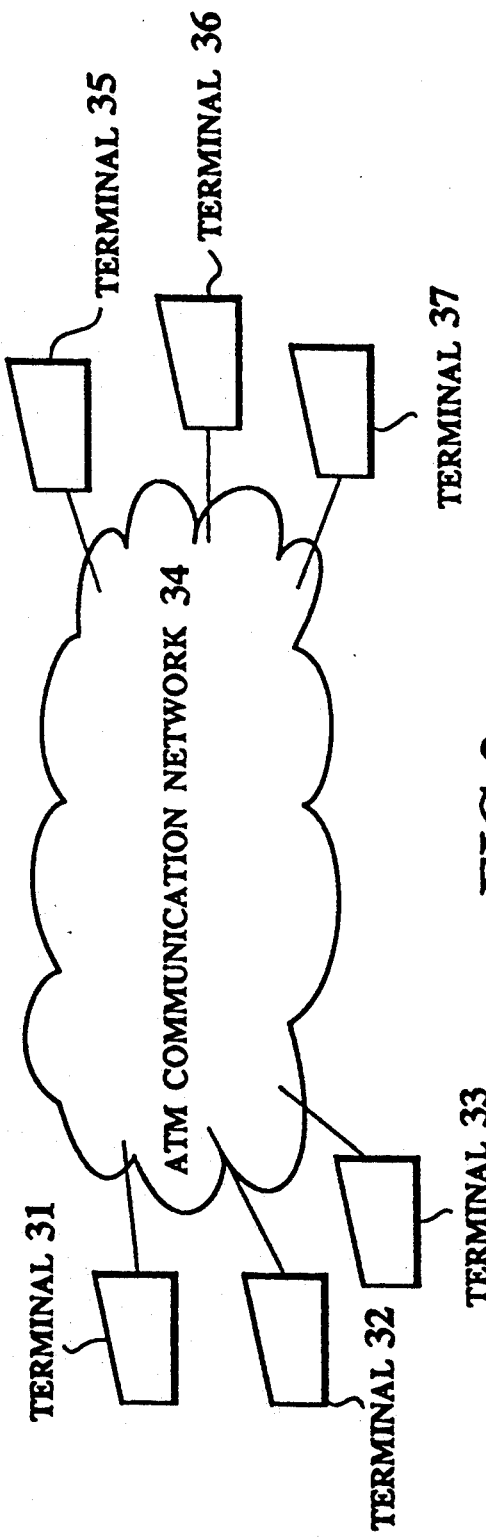
FIG. 1 schematically shows an ATM communication network according to a conventional art.
Figure 2:
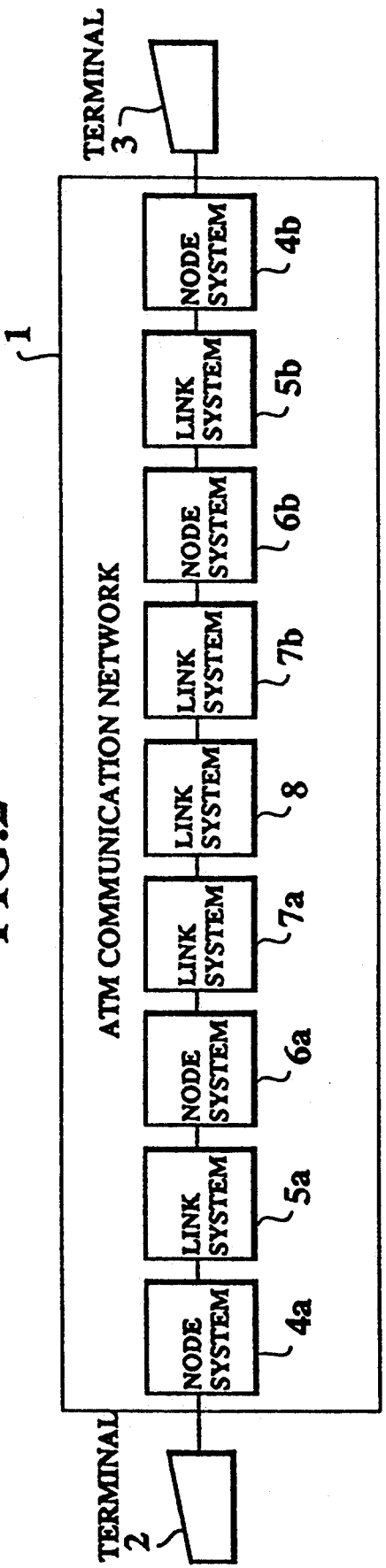
FIG. 2 is a block diagram of an ATM communication network according to the present invention.

FIG. 2 is a block diagram of an ATM communication network according to the present invention.

As shown in FIG. 2, an ATM communication network 1 is connected to a plurality of terminals 2, 3 (two in the drawing). In the ATM communication network 1, a sequence of cells are transmitted from the terminal 2 or 3 to the terminal 3 or 2 through physical transmission channels. Each of the cells is assigned both a virtual path number and a virtual channel number. Flow of cells which have the same virtual path number and the same virtual channel number is logically called a virtual channel. Flow of cells which have the same virtual path number is logically called a virtual path. Therefore, many virtual channels are logically accommodated in one virtual path. In other words, many virtual channels are multiplexed in one virtual path. Also, many virtual channels are multiplexed in one of the physical transmission channels. Furthermore, many virtual paths are multiplexed in one of the physical transmission channels. The ATM communication network comprising:

a plurality of ATM node systems 4a, 6a, 6b, and 4b for changing both the virtual path number and the virtual channel number of each of cells to logically transfer the virtual channels accommodated in one virtual path to another virtual path; and a plurality of ATM link systems 5a, 7a, 8, 7b, and 5b for changing the virtual path number of each of cells to logically divide one virtual path to a plurality of virtual path or to logically combine a plurality of virtual path to one virtual path, the link system 5a (5b) being arranged between the node systems 4a, 6a (4b, 6b) and the link systems 7a, 7b, and 8 being arranged between the node systems 6a, 6b. Each of the ATM node systems is composed of a plurality of exchanges (not shown) which each are connected with an inlet physical transmission channel and an outlet physical transmission channel. Therefore, the virtual channels multiplexed in the inlet physical transmission channels are transferred to the outlet physical transmission channels by each of the ATM node systems. Also, each of the ATM link systems is composed of a plurality of cross-connectors (not shown) which each are connected with an inlet physical transmission channel and an outlet physical transmission channel. Therefore, the virtual paths multiplexed in the inlet physical transmission channels are transferred to the outlet physical transmission channels by each of the ATM link systems.

The node systems 4a, 4b connected to the terminals 2, 3 respectively provide a private network in which physical transmission are switched within a company.

The link systems 5a, 5b connected to the node systems 4a, 4b are equivalent to the cross-connectors utilized by subscribers.

The node systems 6a, 6b connected to the link systems 5a, 5b provide switching centers to switch the virtual channels.

The link systems 7a, 7b connected to the node systems 6a, 6b respectively provide a local network in which the virtual paths are cross-connected.

The link system 8 connected to the link systems 7a, 7b provide a nation network in which the virtual paths are cross-connected.

A group of link systems 7a, 7b, and 8 is utilized for a relay network.

Also, it is possible that the link system 5a be directly connected to the link system 5b without transmitting through the relay network 7a, 7b, and 8 when the node systems 4a and 4b are directly connected with physical transmission channels.

In the above structure, the assignment of a virtual paths to a physical (real) transmission channel is implemented according to a long-term or short-term traffic demand while considering traffic characteristics of each of the virtual paths. In this case, the assignment is implemented with no relation to the control for assigning virtual channels to a virtual path. The assignment of the virtual channel is performed for each call.

In the above assigning control, a prescribed transmission quality determined between the terminals is accomplished by utilizing the node and link systems in which high quality transmission of the cells is accomplished as described in detail hereinafter.

As described in the conventional art, when a group of cells is transmitted from the terminal 2 to the terminal 3 through the ATM communication network 1, the policing control is implemented at the inlet of the node system 4a before the cells pass through the systems in the ATM communication network 1 and the traffic shaping control is implemented at the outlet of the node system 4b after the cells pass through the systems in the ATM communication network 1.

As mentioned above, in the conventional art, the policing control is implemented only once at the inlet of the ATM communication network 1 and the traffic shaping control is also implemented only once at the outlet of the ATM communication network 1 with which the other ATM communication network is connected.

On the other hand, in the present invention, the policing control and the traffic shaping control are respectively implemented in a plurality of locations positioned at inlets and outlets of the systems so that the traffic characteristics of the cells transmitted in the ATM communication network 1 are controlled within the ATM communication network 1.

In detail, even if a public network is subdivided to provide the link systems 7a, 7b constituting the local networks, the link system 8 constituting the nation networks, and the like, the traffic characteristics are controlled in the ATM communication network 1.

Moreover, even if the private network is subdivided to provide the node system 4a, 4b and the like, the traffic characteristics are controlled in the ATM communication network 1.

Next, the policing control and the traffic shaping control are described in detail as follows.

In the ATM communication network, by reserving and assigning a physical network resource such as a transmission band and a buffer capacity, the virtual paths and the virtual channels are logically formed in the physical transmission channels. In this case, communication admission control is performed while one virtual path is regarded as being logically independent of the other virtual paths and one virtual channel is regarded as being logically independent of the other virtual channels. But the reality is that a plurality of virtual paths are logically multiplexed in the same physical transmission channel and a plurality of virtual channels are logically multiplexed in the same physical transmission channel. That is, the real traffic transmitted through the physical transmission channel is not physically limited by the virtual paths or the virtual channels because the virtual paths or the virtual channels are logically provided.

Therefore, if an unexpected traffic inflow occurs because of a failure of a terminal or a piece of an equipment in the premises or a malicious call, a cell transmission quality is not maintained in all virtual paths or virtual channels which commonly utilize the physical transmission channels. To avoid an unexpected inflow of cells and to guarantee the cell transmission quality, the inflow of cells with a virtual path identifier (VPI) or virtual channel identifier (VCI) is monitored at each inlet of the virtual path or the virtual channel and the surplus cells are regulated and for example rejected when the real inflow differs from a call setting which means traffic characteristics declared by each of the terminals. Therefore, a sequence of cells provided from each of the terminals is transmitted while keeping the traffic characteristics determined by a minimum cell arrival interval and a maximum cell arrival frequency. The above mentioned operation is called policing control.

Figure 3:
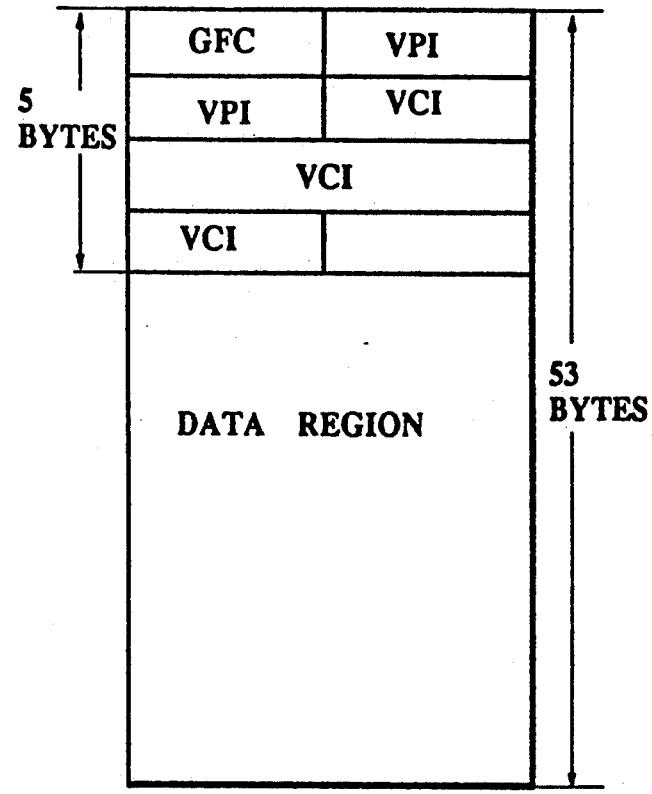
FIG. 3 is a schematic format of a cell which is utilized in the communication network shown in FIG. 2.

The configuration of the cell is described to show how to identify the prescribed cell with reference to FIG. 3.

FIG. 3 is a schematic cell format.

As shown in FIG. 3, the cell comprises:

a header portion (5 bytes) for storing control information; and a data region (48 bytes) for storing data.

The header portion comprises a generic flow control (GFC), virtual path identifier (VPI), and virtual channel identifier (VCI).

In the above configuration, each cell is assigned a virtual path number written in the VPI and a virtual channel number written in the VCI. A flow of cells assigned the same virtual path number logically forms a virtual path. Also, a flow of cells assigned the same virtual path number and the same virtual channel number logically forms a virtual channel.

Accordingly, many types of cells can be identified by reading the control information VPI or VCI so that the cell flow, which comprises the same type of cells, is regulated in the virtual path or the virtual channel.

The policing control for regulating the above-mentioned cells is specifically described with reference to FIG. 4.

Figure 4:
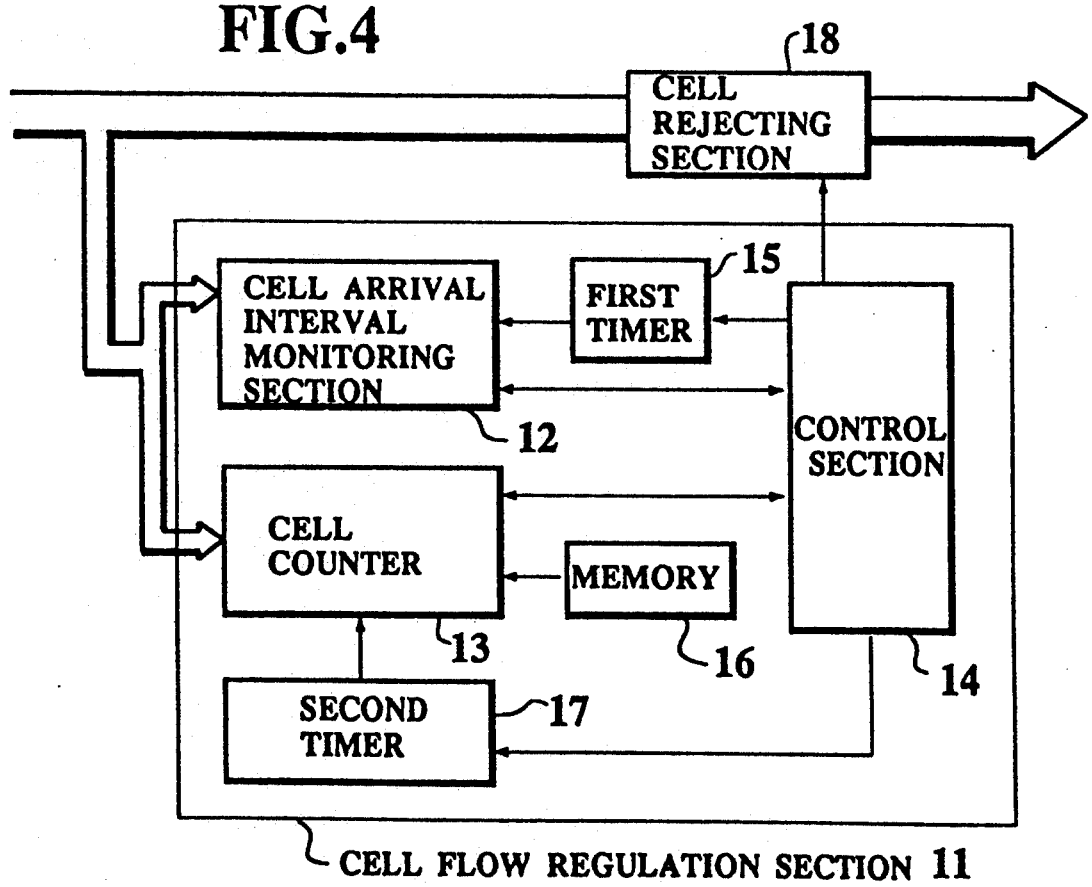
FIG. 4 is a block diagram of a cell flow regulation section which is arranged in the ATM communication network shown in FIG. 2.

FIG. 4 is a block diagram of a cell flow regulation section. The information about the cell flow in a system is transmitted to a cell flow regulation section 11.

As shown in FIG. 4, the cell flow regulation section 11 for regulating a flow of cells in cases where the flow of cells violates prescribed traffic characteristics determined by a minimum cell arrival interval and a maximum cell arrival frequency which are allowed to the flow of cells, comprises:

a monitoring section 12 for monitoring the cell arrival interval by receiving the cell flow information, this section 12 storing the minimum cell arrival interval allowed for each virtual path or virtual channel;

a cell counter 13 for counting the number of cells which arrive at the regulation section 11 satisfying the minimum cell arrival interval to obtain information about a cell arrival frequency of the flow of cells arriving at the cell flow regulation section 11;

a control section 14 for determining the regulation of the cell after receiving information about the cell arrival interval from the monitoring section 12 and the information about the cell arrival frequency from the cell counter 13;

a first timer 15 for measuring a cell arrival interval of the cells arriving at the section, the timer 15 being started after receiving instructions from the control section 14;

a memory 16 for storing a regular period of time for measuring a cell arrival frequency of the cells arriving at the section 11 and a the maximum cell arrival frequency, the cell arrival frequency being allowed for each virtual path or virtual channel;

a second timer 17 for counting an elapsed time until the regular period of time stored in the memory 16 passes under the control of the control section 14; and a cell rejecting section 18 for rejecting or passing the cell under the control of the control section 14.

In the above configuration, the monitoring section 12 and the cell counter 13 are informed that a first cell has arrived at the cell flow regulation section 11.

First, the operation for measuring the arrival interval of the cells will be described.

The information of the cell arrival is transmitted from the monitoring section 12 to the control section 14 so that the timer 15 is operated to measure elapsed time, time after time, after the first cell has arrived at the cell flow regulation section 11. The elapsed times are provided to the monitoring section 12 one by one.

In the monitoring section 12, when a second cell arranged the same virtual path number and/or the same virtual channel number as the first cell has arrived at the cell flow regulation section 11, the monitoring section 12 is informed that the second cell has arrived. Then, the elapsed time between the first cell and the second cell is compared to the minimum cell arrival interval.

When the elapsed time is smaller than the minimum cell arrival interval, the control section 14 is informed that a surplus cell has arrived at the regulation section 11. In the control section 14, the instruction to reject the surplus cell is transmitted to the cell rejecting section 18. In the cell rejecting section 18, the second cell is rejected. This rejecting operation is continued until the elapsed time is equal to the minimum cell arrival interval.

Therefore, the subsequent cells arranged to have the same virtual path number and/or the same virtual channel number as the first cell are rejected until the elapsed time is equal to the minimum cell arrival interval.

On the other hand, when the elapsed time is longer than the minimum cell arrival interval, the control section 14 is informed that a cell keeping the minimum cell arrival interval has arrived at the regulation section 11. In the control section 14, the instruction to count the second cell arriving at the regulation section 11 is transmitted to the cell counter 13. Therefore, in the cell counter 13, the second cell is counted after the first cell is counted.

Next, the operation for measuring the arrival frequency of the cells will be described.

When the arrival of the first cell is counted in the cell counter 13, the control section 14 is informed that the first cell has arrived. In the control section 14, the instruction for operating the timer 17 is transmitted to the timer 17 to measure the elapsed time after the first cell has been received. When the cell counter 13 is informed of the arrival of subsequent cells following the first cell by the monitoring section 12 through the control section 14, the subsequent cells is counted. After counting the subsequent cells, the number of cells counted in the cell counter 13 is compared to the maximum cell arrival frequency which is read out from the memory 16.

The operation for counting the subsequent cells and comparing the counted number to the maximum cell arrival frequency is continued until the elapsed time measured in the timer 17 is equal to the regular period of time which is read out from the memory 16.

When the number of cells counted in the cell counter 13 exceeds the maximum cell arrival frequency before the regular period of time passes, the control section 14 is informed of violation information that the number of arriving cells exceeds the maximum cell arrival frequency. In the control section 14, the instruction for rejecting the cells arriving at the section 11 after the provision of the violation information to the control section 14 is transmitted to the cell rejecting section 18. Therefore, the subsequent cells are rejected in the cell rejecting section 18 one by one.

On the other hand, when the number of arrived cells does not exceed the maximum cell arrival frequency until the regular period of time passes, the subsequent cells are provided to a next system without being rejected in the rejecting section 18.

In the above-mentioned policing control, there are two types of control. The first is called VP policing control and the second is called VC policing control.

When a group of cells assigned the same virtual path number as one another is regulated in the regulation section 11, the control is called VP policing. On the other hand, when a group of cells assigned both the same virtual path number and the same virtual channel number as one another is regulated in the regulation section 11, the control is called VC policing.

Next, the traffic shaping control is described as follows.

Inlet traffic characteristics of a flow of cells provided to a subdivided system is largely changed to outlet traffic characteristics by the multiplexing process or the switching process at outlets of the subdivided system. Therefore, the traffic shaping control is performed to correct the outlet traffic characteristics to prescribed traffic characteristics allowed to the flow of cells at the outlet of the subdivided system. The purpose of traffic shaping is to provide admission control without lowering the throughput of a network.

Figure 5:
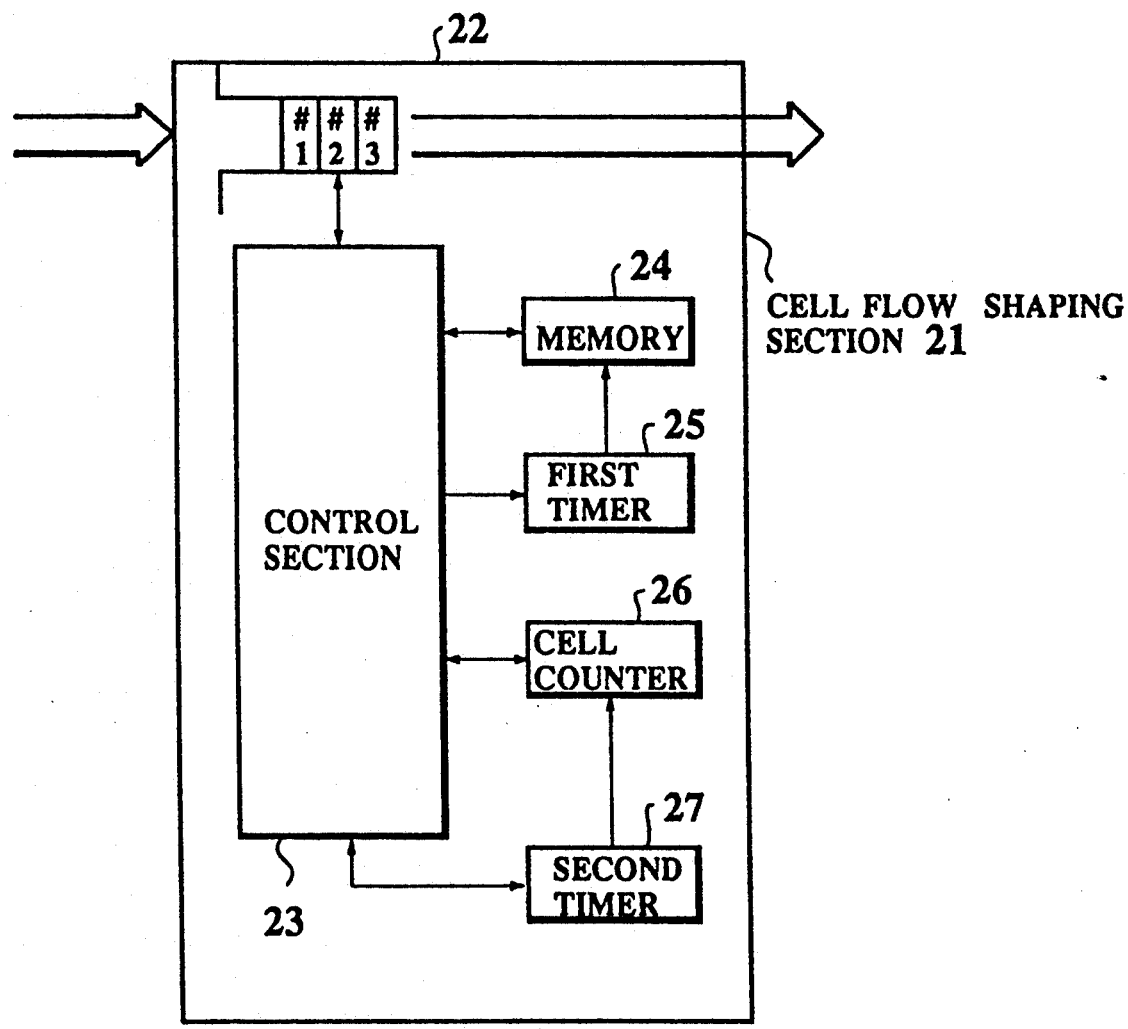
FIG. 5 is a block diagram of a cell flow shaping section which is arranged in the ATM communication network shown in FIG. 2.

FIG. 5 is a block diagram of a cell flow shaping section. As shown in FIG. 5, a cell flow shaping section 21 comprises:

a buffer 22 for storing cells arriving through a physical transmission line, each of the cells being assigned a virtual path number and a virtual channel number;

a control section 23 for controlling a traffic shaping operation;

a plurality of memories 24 for respectively storing a minimum cell arrival interval allowed to a flow of the cells, each memory 24 being arranged for one virtual path or virtual channel;

a plurality of first timers 25 for respectively measuring the elapsed time after a first cell has been received until the elapsed time is equal to the minimum cell arrival interval, one first timer 25 being provided for one memory 24;

a plurality of cell counters 26 for counting each of the cells under the control of the control section 23 and storing a maximum cell arrival frequency allowed to a flow of the cells, one counter 26 being provided for one virtual path or virtual channel; and a plurality of second timers 27 for respectively measuring the elapsed time until the elapsed time is equal to a regular period of time, one second timer 27 being provided for one cell counter 26.

In the above configuration, for example, there types of cells #1, #2, and #3 are received at the cell flow shaping section 21 to be stored in the buffer 22. A type of cells #1 have the same virtual path number and/or the same virtual channel number as one another so that a virtual path or a virtual channel is formed of a flow of the cells #1. Also, a virtual path or a virtual channel is formed of a flow of the cells #3. In addition, a virtual path or a virtual channel is formed of a flow of the cells #2.

The arrival information of those cells #1, #2, and #3 is provided to the control section 23 in turn.

Initially, when the arrival information of the first cell #1 is provided to the control section 23, the information is stored in the memory 24 and the first timer 25 is operated to measure the elapsed time after the first cell #1 has been provided. Then, the second cell #3 is stored in the other memory 24 because the type of the cell #3 differs from that of the cell #1.

Thereafter, when the arrival information of the third cell #1 is provided to the control section 23, the information is stored into the memory 24 in which the first cell #1 has already been stored. At this time, the elapsed time is compared to the minimum cell arrival interval.

When the elapsed time is shorter than the minimum cell arrival interval, the third cell #1 is stored in the buffer 22. Then, after a time, when the elapsed time has passed the minimum cell arrival interval, the arrival information of the third cell #1 is transmitted to the cell counter 26 through the control section 23.

On the other hand, when the elapsed time is longer than the minimum cell arrival interval, the arrival information of the third cell #1 is promptly transmitted to the cell counter 26 through the control section 23.

In the cell counter 26, when the arrival information of the first cell #1 is provided to the control section 23, the first cell #1 is counted. At this time, the second timer 27 is operated to measure the elapsed time under the control of the control section 23. Thereafter, when the arrival information of the third cell #1 is transmitted to the cell counter 26, the third cell #1 is counted by the cell counter 26. At this time, the number of cells #1 is compared to the cell arrival frequency for each cell arrival.

In the same manner, when the arrival information of subsequent cells #1 is transmitted to the cell counter 26, the subsequent cells #1 are counted one by one.

When the number of cells #1 is equal to or smaller than the maximum cell arrival frequency, the cells #1 are transmitted to a next system from the buffer 22.

On the other hand, when the number of cells #1 exceeds the maximum cell arrival frequency, the subsequent cells #1 are stored in the buffer 22 until a new measuring cycle is started after the regular period of time has passed.

In the above mentioned traffic shaping control, there are two types of control. The first is called VP traffic-shaping control and the second is called VC traffic-shaping control.

When a group of cells with a virtual path number is regulated in the shaping section 21, the control is VP traffic shaping. On the other hand, when a group of cells with a virtual channel number is regulated in the shaping section 21, the control is VC traffic shaping.

Next, the policing control in the ATM communication network 1 shown in FIG. 2 is described.

The VC policing is performed at the inlet of the ATM node systems. The purpose of the VC policing is to clarify the sphere of responsibility for the network and to guarantee the cell transmission quality in virtual channels which violate traffic characteristics allowed to the virtual channels when virtual paths respectively accommodating a plurality of virtual channels are logically divided into or combined to other virtual paths at an upstream link system.

The reason that the VC policing is performed at the inlet of the ATM node system 4a is to clarify the sphere of responsibility between the ATM private network provided by the node system 4a and the terminal 2 and to guarantee the cell transmission quality in some virtual channels which are connected to a specific network resource in common with the virtual channel connected to the terminal 2.

The reason that the VC policing is performed at the inlet of the ATM node system 6a, 6b is to clarify the sphere of responsibility between the ATM public network integrally provided by the node systems 6a, 6b and the user and to guarantee the cell transmission quality in some virtual channels which are connected to a specific network resource in common with the virtual channel connected to the user's terminal.

At the connecting point from the ATM link system 5b to the ATM node system 4b, the VC policing is not normally required because the channel is connected to the network. However, in the special case where a private channel network for directly connecting the link system 5b to the node system 4a through a direct virtual path is commonly utilized by a plurality of users, when the VC policing is not properly performed at the node system 4b, the traffic characteristics are changed in some virtual channels which are connected to a specific network resource in common with the virtual channel connected to the terminal 3.

Therefore, the VC policing is performed at the inlet of the ATM node system 4b for the specific virtual channels multiplexed in the direct virtual path.

On the other hand, the VP policing is performed at the inlet of the ATM link system. The main reason that the VC policing is performed is to guarantee the cell transmission quality in some virtual paths which violate traffic characteristics allowed to the virtual paths when virtual channels accommodated in a virtual path are logically transferred to another virtual path at an upstream node system.

In the subscriber's system for the ATM communication network 1, after a plurality of virtual paths are gathered in the link system 5a, the VC policing is performed at the inlet of the node system 6a. Therefore, when a group of cells are transmitted through a certain virtual channel in violation of a declaration value, the cell transmission quality in the virtual path accommodating the virtual channel and in the other virtual paths which are connected to a specific resource in common with the virtual path cannot be guaranteed.

Therefore, the VP policing is performed at the inlet of the link system 5a to prevent interference between a plurality of multiplexed virtual paths.

At the inlet of ATM the relay path network 7a, 7b, and 8, which is at the connecting point from a node system 6a to the link system 7a, the VP policing is not basically required because the connection is made between the equipment in the same network. However, when the admission control or the VC policing is not operated well in the node system 6a and the traffic characteristics of a certain virtual path deviate from the predetermined characteristics, an adverse influence extends to the virtual path and the other virtual paths which are connected to a specific resource in common with the virtual path.

Therefore, to prevent the adverse influence from extending to the whole system, to guarantee the cell transmission quality in the other virtual paths, and to easily specify the location of a failure, the VP policing is performed at the inlet of the link system 7a (that is, at the inlet of the ATM relay path network).

The purpose of the VP policing at the inlet of the ATM relay path network is to clearly separate the band management of the virtual path in the path network from the band management of the virtual channel in the line network. Therefore, the assignment of the virtual path can be controlled by utilizing an algorithm for assigning the control of the virtual channel.

In the subscriber's system, the VP policing is not basically required at the connecting point from a node system 6b to the link system 5b because the connection is made between the equipment in the same network. However, when the admission control or the VC policing is not operated well in the node system 6b and the traffic characteristics of a certain virtual path deviates from predetermined characteristics, the cell transmission quality can not satisfied in the virtual path and the other virtual paths which are connected to a specific resource in common with the virtual path.

Therefore, to prevent the adverse influence from extending to the other virtual path, to guarantee the cell transmission quality in the other virtual paths, and to easily specify the location of a failure, the VP policing is performed at the connecting point from the node system 6b to the link system 5b.

The purpose of the VP policing at the inlet of the ATM relay path network is to clearly separate the band management of the virtual path in the path network from the band management of the virtual channel in the line network. Therefore, the assignment of the virtual path can be controlled by utilizing an algorithm for assigning the control of the virtual channel.

Next, the traffic shaping control in the ATM communication network 1 shown in FIG. 2 is described.

The traffic shaping is performed at specific locations in which the traffic characteristics of the virtual paths or virtual channels are largely changed by the multiplexing or switching process.

The traffic shaping is performed to make it possible to control the admissions without lowering the throughput of the network. In the VP traffic shaping, the traffic characteristics of the virtual path conform to the prescribed traffic characteristics such as a minimum cell arrival interval and a maximum cell arrival frequency allowed to the virtual path. In the VC shaping, the traffic characteristics of the virtual channel conform to the prescribed traffic characteristics such as a minimum cell arrival interval and a maximum cell arrival frequency allowed to the virtual channel.

In each link system 7a, 7b, and 8 constituting the ATM relay path network, because the virtual paths are multiplexed or cross-connected, the traffic characteristics of each virtual path are changed by buffering the cells thereof. However, the property of the burst existing in the traffic characteristics of the virtual path may not be as large as that of the virtual channel and the change in the traffic characteristics of the virtual path may be smaller than that of the virtual channel. Moreover, the operating load in the link systems is usually not larger than that in the node systems. Therefore, the VP traffic shaping is not mandatory at the outlet of each link system.

However, if necessary, the VP traffic shaping is performed at the outlets of the link systems though the VP traffic shaping is not performed at the outlet of the link system in this detailed description.

In the node system 4a, because a number of virtual channels are multiplexed or switched, the traffic characteristics are largely changed in each virtual channel. Therefore, to make the traffic characteristics of the virtual channel conform to a declaration value determined when a call is performed, the VC traffic shaping is performed at the outlet of the node system 4a.

In the node system 4a, because a number of virtual channels is multiplexed or switched, the traffic characteristics are largely changed in each virtual channel. Therefore, the traffic characteristics of the virtual path in which the virtual channels are multiplexed are also largely changed. Accordingly, to make the traffic characteristics of the virtual path conform to prescribed traffic characteristics such as a minimum cell arrival interval and a maximum cell arrival frequency allowed to the virtual path, the VP traffic shaping is performed at the outlet of the node system 4a.

In the node system 6a, because a number of virtual channels is multiplexed or switched, the traffic characteristics are largely changed in each virtual channel. Therefore, the traffic characteristics of the virtual path in which the virtual channels are multiplexed are also largely changed. Accordingly, to make the traffic characteristics of the virtual path conform to prescribed traffic characteristics such as a minimum cell arrival interval and a maximum cell arrival frequency allowed to the virtual path, the VP traffic shaping is performed at the outlet of the node system 6a.

In the node system 6b, because a number of virtual channels is multiplexed or switched, the traffic characteristics are largely changed in each virtual channel. Therefore, the traffic characteristics of the virtual path in which the virtual channels are multiplexed are also largely changed. Accordingly, to make the traffic characteristics of the virtual path conform to prescribed traffic characteristics such as a minimum cell arrival interval and a maximum cell arrival frequency allowed to the virtual path, the VP traffic shaping is performed at the outlet of the node system 6b.

Figure 6:
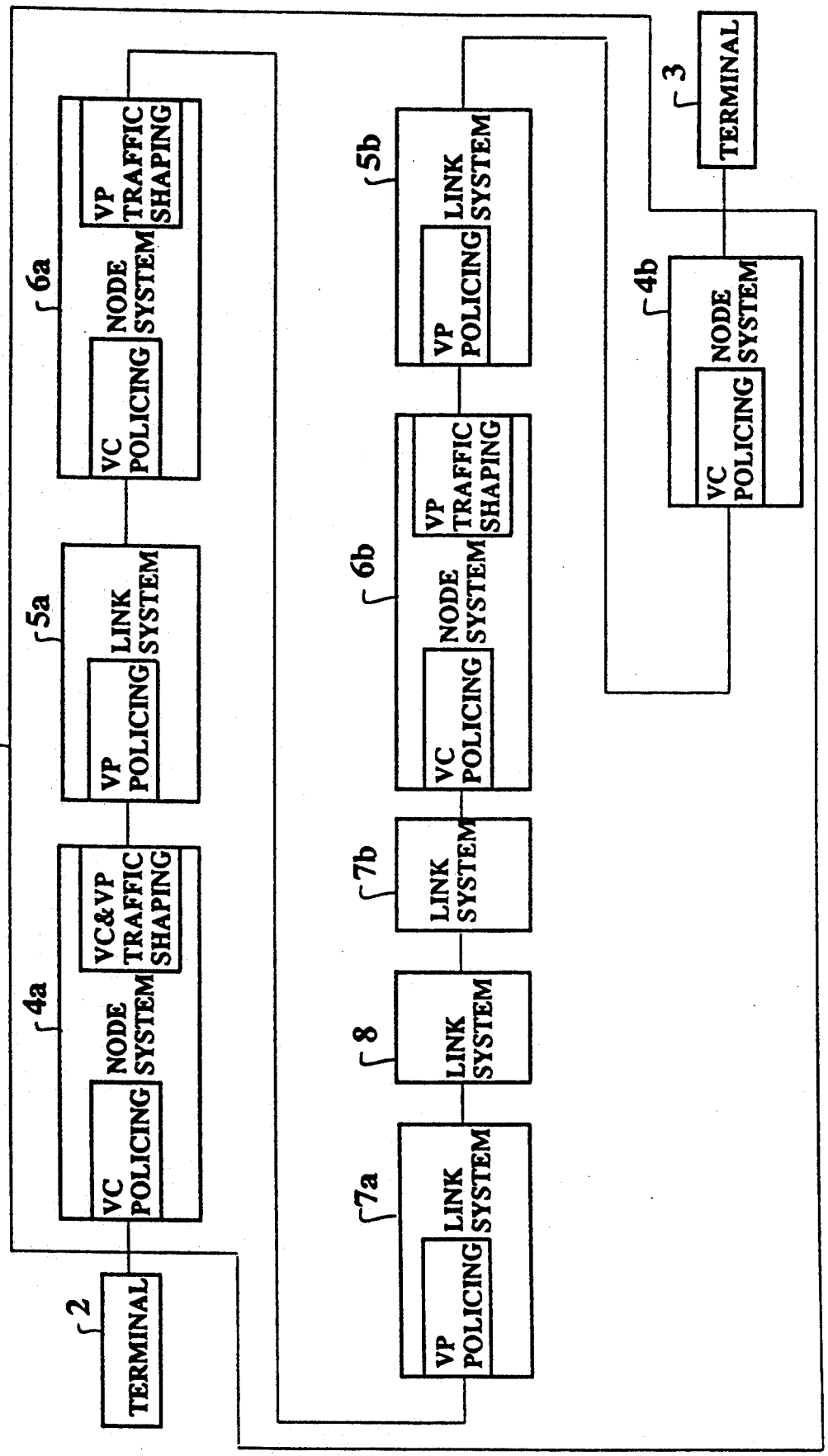
FIG. 6 is an explanatory diagram of the ATM communication network, shown in FIG. 2, in which policing and traffic shaping are performed at many systems.
Figure 7:
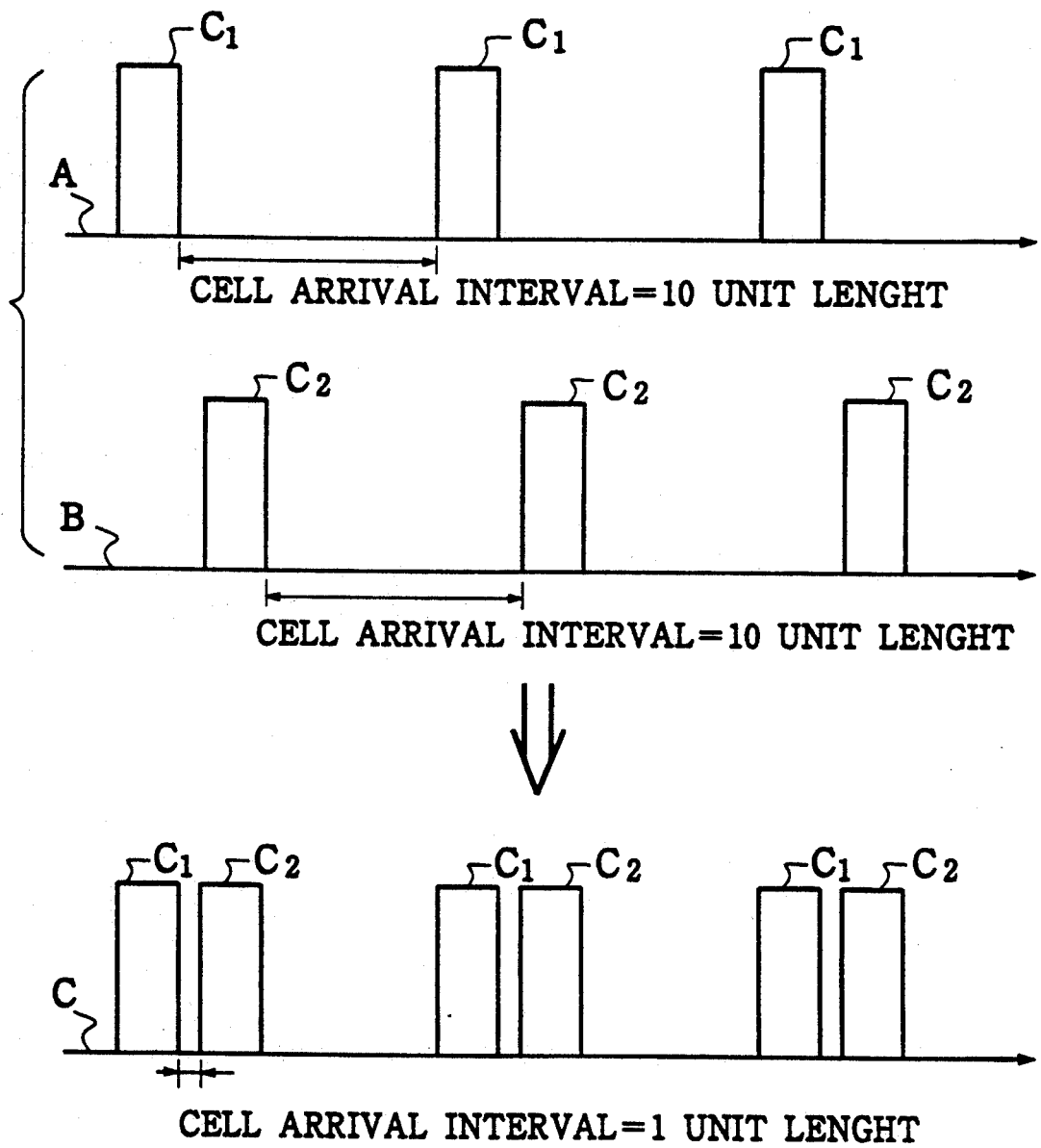
FIG. 7 shows cell arrival interval in conventional art which pertains to the problem of traffic characteristics.

FIG. 6 shows the location of the VC policing, the VC traffic shaping, the VP policing, and the VP traffic shaping in the communication network 1 based on the above explanation.

However, the location of the policing and traffic shaping as shown in FIG. 6 does not limit the present invention. That is, if necessary, it is preferable that the VC or VP polocing be performed at the inlet of an arbitrary system and VC or VP traffic shaping be performed at the outlet of an arbitrary system.

Accordingly, as mentioned above in detail, because a plurality of cell flow regulating sections 11 are provided at the inlet of the node and link systems of the ATM communication network, when the predetermined traffic characteristics are violated intentionally or by a failure of some link systems or some node systems in any virtual path or virtual channel of the divided systems, the violation of the traffic characteristics can be immediately detected.

Also, it is possible to determine the specific location at which a failure has occurred in the ATM communication network.

Moreover, because a plurality of cell flow shaping sections 21 are provided at the outlets of the node and link systems of the ATM communication network, even if the traffic characteristics are changed at the outlets of the systems because of the switching operation or the multiplexing operation for the cells, it is possible to immediately shape the changed traffic characteristics to the original traffic characteristics which are predetermined for each terminal. Therefore, it is possible to prevent the transmission quality deteriorating in the downflow system.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A traffic control method for controlling traffic characteristics of fixed-length information units and transmitting the information units one after another from an upstream divided system to a downstream divided system through a physical transmission channel in an asynchronous transfer mode communication network, comprising the steps of:

assigning an identification number to each of the information units to identify the information units, each identification number defining traffic characteristics of the information units;

providing the information units to the upstream divided system while a sequence of information units assigned a same identification number maintains the traffic characteristics imposed thereon;

changing the identification number assigned to the sequence of information units to at least one other identification number in the upstream divided system, thereby changing the traffic characteristics of the information units;

transmitting the information units from the upstream divided system to the downstream divided system;

monitoring the information units transmitted from the upstream divided system at an inlet of the downstream divided system to determine whether the sequence of information units having the changed identification number in the upstream divided system maintains the traffic characteristics imposed thereon; and rejecting a portion of the information units transmitted from the upstream divided system to maintain the traffic characteristics of the information units when the sequence of information units having the changed identification number in the upstream divided system violate the traffic characteristics; and providing the information units transmitted from the upstream divided system to the downstream divided system when the sequence of information units having the changed identification number in the upstream divided system maintains the traffic characteristics.

2. A method according to claim 1 in which the step of assigning an identification number to each of the information units includes the substeps of:

assigning a virtual path number as a portion of the identification number to identify a virtual path over which the information units will travel; and assigning a virtual channel number as another portion of the identification number to identify a virtual channel over which the information units will travel;

the step of monitoring the information units includes the substeps of:

measuring an information unit arrival interval as one of the traffic characteristics, the arrival interval being a traffic characteristic of the virtual channel; and measuring an information unit arrival frequency as another one of the traffic characteristics, the arrival frequency being a traffic characteristic of the virtual channel, and the step of rejecting a portion of the information units includes the substep of:

rejecting a portion of the information units when at least one of the information unit arrival interval measured in the step of monitoring the information units is smaller than a minimum information unit arrival interval allowed to the virtual channel and, the information unit arrival frequency measured in the step of monitoring the information units is larger than a maximum information unit arrival frequency allowed to the virtual channel.

3. A method according to claim 1 in which the step of assigning an identification number to each of the information units includes the substeps of:

assigning a virtual path number as a portion of the identification number to identify a virtual path over which the information units will travel; and assigning a virtual channel number as another portion of the identification number to identify a virtual channel over which the information units will travel;

the step of monitoring the information units include the substeps of:

measuring an information unit arrival interval as one of the traffic characteristics, the arrival interval being a traffic characteristic of a virtual path in which a plurality of virtual channels are accommodated; and measuring an information unit arrival frequency as another one of the traffic characteristics, the arrival frequency being a traffic characteristic of the virtual path; and the step of rejecting a portion of the information units includes the substeps of:

rejecting a portion of the information units when at least one of the information unit arrival interval measured in the step of monitoring the information units is smaller than a minimum information unit arrival interval allowed to the virtual path and, the information unit arrival frequency measured in the step of monitoring the information units is larger than a maximum information unit arrival frequency allowed to the virtual path.

4. A traffic control method for controlling traffic characteristics of fixed-length information units provided to a divided system through a physical transmission channel in an asynchronous transfer mode communication network, comprising the steps of:

assigning an identification number to each of the information units to identify the information units, each identification number defining traffic characteristics of the information units;

providing the information units to the divided system while a sequence of information units assigned a same identification number maintains the traffic characteristics imposed thereon;

changing the identification number assigned to the sequence of information units in the divided system to at least one other identification number, thereby changing the traffic characteristics of the sequence of information units;

monitoring the information units provided to the divided system at an outlet of the divided system to determine whether the sequence of information units having the changed identification number in the divided system maintains the traffic characteristics imposed thereon;

storing a portion of the information units to be transmitted from the divided system until the traffic characteristics imposed thereon are satisfied when the sequence of information units having the changed identification number in the divided system violates the traffic characteristics imposed thereon; and transmitting the stored portion of the information units from the divided system to another divided system after the traffic characteristics imposed on the sequence of information units having the changed identification number in the divided system are satisfied.

5. A method according to claim 4 in which the step of assigning an identification number includes the substeps of:

assigning a virtual path number as a portion of the identification number to identify a virtual path over which the information units will travel; and assigning a virtual channel number as another portion of the identification number to identify a virtual channel over which the information units will travel;

the step of monitoring the information units includes the substeps of:

measuring an information arrival interval as one of the traffic characteristics, the arrival interval being a traffic characteristic of the virtual channel; and measuring an information unit arrival frequency as another one of the traffic characteristics, the arrival frequency being a traffic characteristic of the virtual channel; and the step of storing a portion of the information units includes the substep of:

storing a portion of the information units when at least one of the information unit arrival interval measured in the step of monitoring the information units is smaller than a minimum information unit arrival interval allowed to the virtual channel and, when the information unit arrival frequency measured in the step of monitoring the information units is larger than a maximum information unit arrival frequency allowed to the virtual channel.

6. A method according to claim 4 in which the step of assigning an identification number of each of the information units includes the substeps of:

assigning a virtual path number as a portion of the identification number to identify a virtual path over which the information units will travel; and assigning a virtual channel number as another portion of the identification number to identify a virtual channel over which the information units will travel;

the step of monitoring the information units includes the substeps of:

measuring an information unit arrival interval as one of the traffic characteristics, the arrival interval being a traffic characteristic of a virtual path in which a plurality of virtual channels are accommodated; and measuring an information unit arrival frequency as another one of the traffic characteristics, the arrival frequency being a traffic characteristic of the virtual path; and the step of storing a portion of the information units includes the substep of:

storing a portion of the information units when at least one of the information unit arrival interval measured in the step of monitoring the information units is smaller than a minimum information unit arrival interval allowed to the virtual path and, the information unit arrival frequency measured in the step of monitoring the information units is larger than a maximum information unit arrival frequency allowed to the virtual path.

7. A traffic control system for controlling traffic characteristics of fixed-length information units and transmitting the information units one after another in an asynchronous transfer mode communication network, comprising:

a plurality of divided systems, arranged in series in the asynchronous transfer mode communication network, for relaying the information units;

a plurality of information flow regulating sections, respectively arranged at an inlet of each of the divided systems, for respectively monitoring information units provided to each of the divided systems to determine whether the information units are transmitted while maintaining traffic characteristics imposed on a flow of information units and rejecting information units which violate the traffic characteristics; and a plurality of information flow shaping sections, respectively arranged at an outlet of each of the divided systems, for respectively monitoring the information units provided from each of the divided systems to determine whether or not the information units are transmitted while keeping traffic characteristics imposed on a flow of the information units and storing information units which violate the traffic characteristics until the flow of the information units maintains the traffic characteristics.

8. A system according to claim 7 in which each of the information flow regulating sections, comprise:

an arrival interval monitoring section for monitoring an arrival interval of the information units which arrive at the inlet of each of the divided systems;

an arrival frequency monitoring section for monitoring an arrival frequency of the information units; and an information unit rejecting section for rejecting information units which at least one of arrive at the arrival interval monitoring section at a shorter interval than a minimum arrival interval allowed to the information units and, arrive at the arrival frequency monitoring section at a larger frequency than a maximum arrival frequency allowed to the information units, said information rejecting section also for regulating a flow of the information units to maintain both the minimum arrival interval and the maximum arrival frequency.

9. A system according to claim 7 in which each of the information flow shaping sections, comprise:
   an arrival interval monitoring section for monitoring an arrival interval of the information units which arrive at the outlet of each of the divided systems;
   an arrival frequency monitoring section for monitoring an arrival frequency of the information units; and
   an information unit storing section for storing information units which at least one of arrive at the arrival interval monitoring section at an interval shorter than a minimum arrival interval allowed to the information units and, arrive at the arrival frequency monitoring section at a larger frequency than a maximum arrival frequency allowed to the information units, said information unit storing section also for shaping a flow of the information units to keep both the minimum arrival interval and the maximum arrival frequency.

* * * * *